Aug. 29, 1967  J. CHAMBERLAIN ET AL  3,338,051
HIGH VELOCITY RAM INDUCTION BURNER
Filed May 28, 1965  3 Sheets-Sheet 1
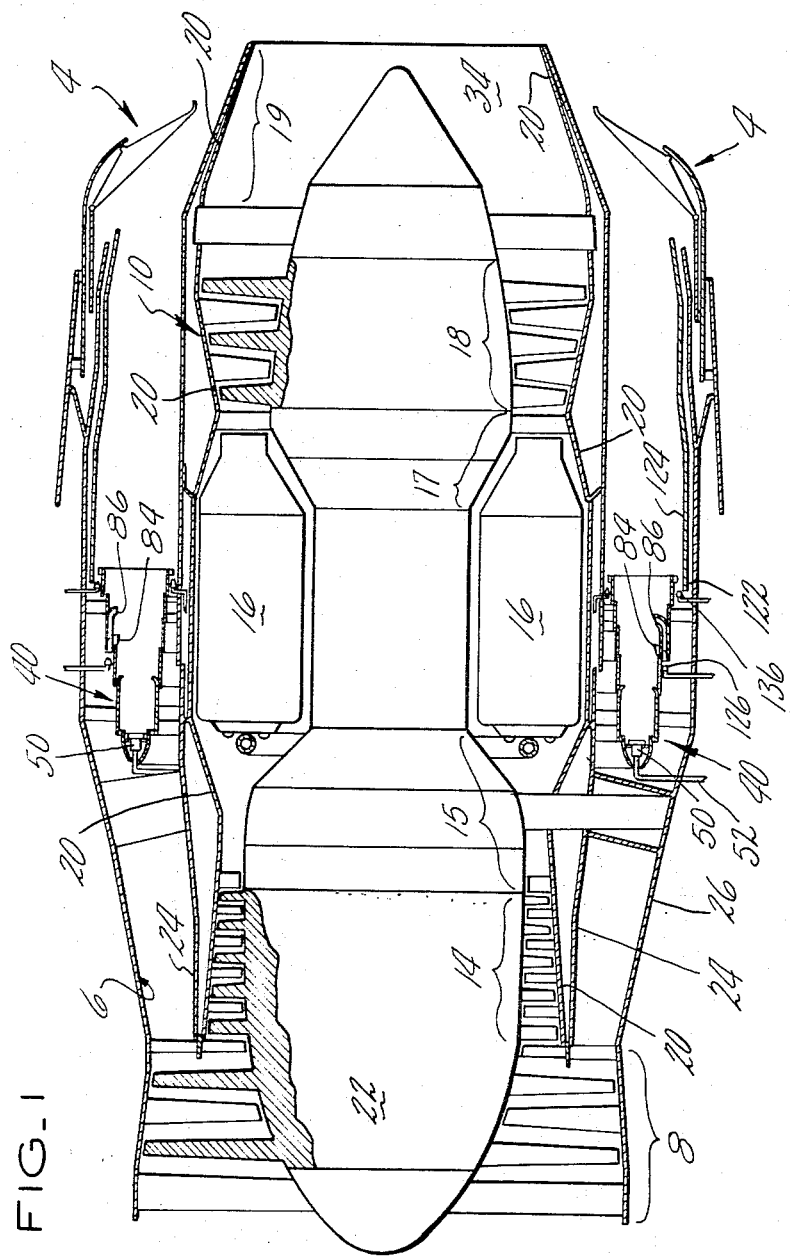
FIG_1
INVENTORS
JOHN CHAMBERLAIN
UGO G. VOLPI
BY Jack N. McCarthy
AGENT Aug. 29, 1967  J. CHAMBERLAIN ET AL  3,338,051
HIGH VELOCITY RAM INDUCTION BURNER
Filed May 28, 1965  3 Sheets-Sheet 2
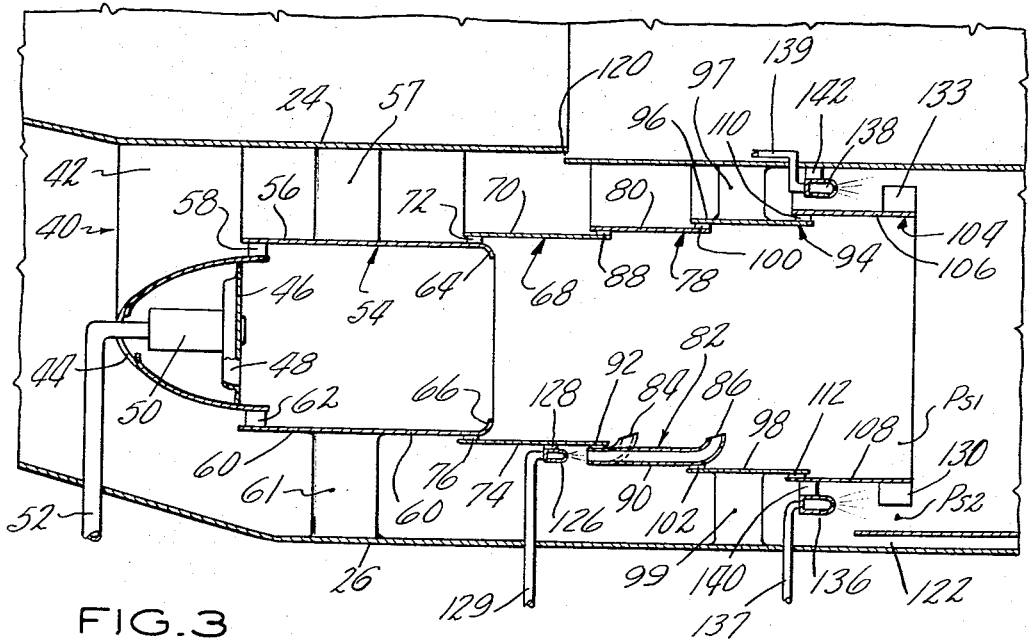
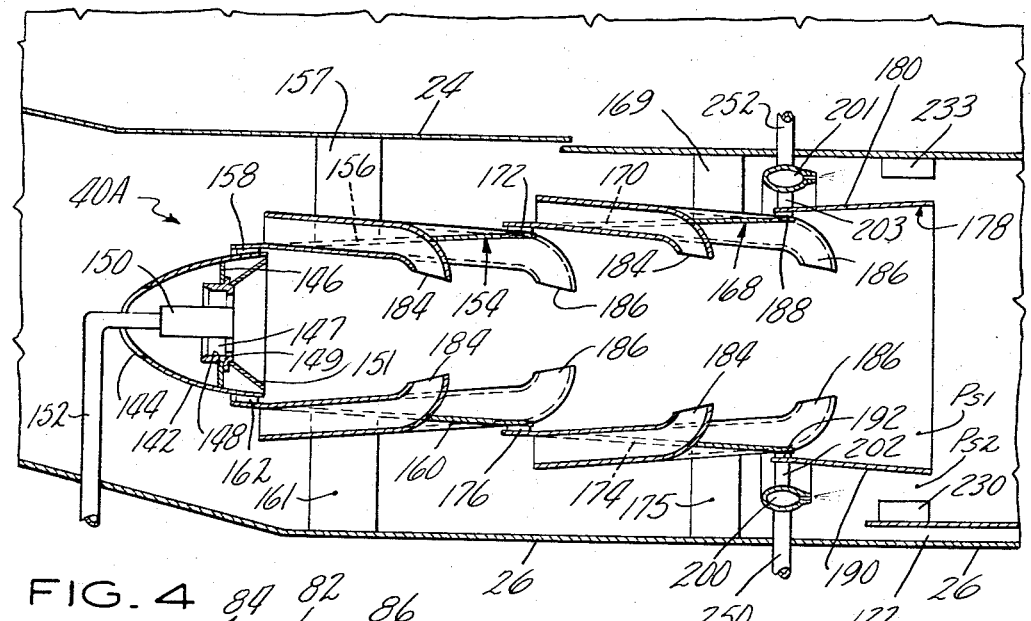
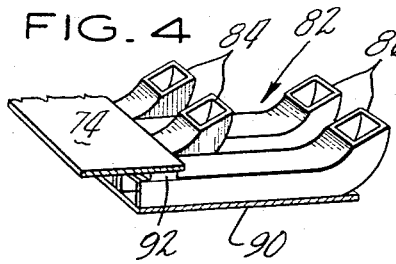
INVENTORS
JOHN CHAMBERLAIN
UGO G. VOLPI
BY Jack N. McCarthy
AGENT Aug. 29, 1967   J. CHAMBERLAIN ET AL   3,338,051
HIGH VELOCITY RAM INDUCTION BURNER Filed May 28, 1965   3 Sheets-Sheet 3

INVENTORS
JOHN CHAMBERLAIN
UGO G. VOLPI

BY Jack N. M. Corthy
AGENT

United States Patent Office 3,338,051
Patented Aug. 29, 1967

3,338,051
HIGH VELOCITY RAM INDUCTION BURNER
John Chamberlain, North Palm Beach, and Ugo G. Volpi, Riviera Beach, Fla., assignors to United Aircraft Corporation, East Hartford, Conn., a corporation of Delaware
Filed May 28, 1965, Ser. No. 459,565
7 Claims. (Cl. 60—39.65)

ABSTRACT OF THE DISCLOSURE

A high velocity ram induction burner having a main duct with an air inlet, a burner can located therein, and an outlet. Said burner can being formed of telescoping sleeves and having scoops positioned on some of said sleeves for directing air from said main duct into said burner can. Second fuel injection means being located adjacent the rear of said burner can to inject fuel into the mixture formed by exhaust from said burner can and bypass air flowing through said main duct around said burner can. Said burner can having a cross-sectional area which fills approximately two thirds of the main duct. Said bypass air amounting to approximately two thirds of the total flow through said main duct, said other one third passing through the burner can.

---

This invention relates to a high velocity ram induction duct burner and more particularly to a burner for adding heat to the bypass air of a fan engine for increasing augmentation of this stream.

In a conventional turbojet aircraft engine, air passes through an aligned compressor, burner and turbine and is then discharged to atmosphere through an exhaust outlet to generate thrust. Generaly speaking, a ducted fan engine adds the feature of taking a portion of engine air from an engine station such as the compressor and discharging it to atmosphere to generate thrust other than through the aforementioned exhaust outlet. In conventional ducted fan engine design, the additional duct is of circular cross section and envelops the engine to form an annular air passage therebetween.

Recently, interest has been centering on a duct burner for a fan engine and this duct burner has performance requirements having a wide range encompassing both main burner and afterburner capabilities as regards combustion efficiency, operating range, and pressure loss. The inlet conditions of a duct burner have the relatively low air temperature of a main burner and the relatively high Mach number flow of an afterburner. These conditions do not lend themselves to high combustion efficiency. The capabilities of the conventional main burner design system and the afterburner system are such that neither meet the requirements of a duct burner system. The operating inlet conditions of a duct burner for a normal flight mission are typically as follows:

Temperature _____ °F__ 200–800
Pressure _____ p.s.i.a__ 10–50
Reference Mach No. _____ .12–.2

A main burner of a conventional jet engine in use today consists chiefly of a diffuser to slow down the air velocity coming out of the compressor, and a burner. The burner usually has a swirler to stabilize flow along the length of the burner and holes normal to the burner along its sides. While there are many variations on this basic design, a means for recovering the velocity head with the diffuser and taking this pressure as a loss through holes in the burner wall to provide the stability and mixing of the fuel and air is generally common to all main burners.

A conventional afterburner operates effectively only in a high inlet temperature system, and at comparatively high fuel-air ratios. The conventional design is basically the use of a body in a fuel-air mixture stream for holding a flame which burns across the stream.

The requirements of a burner located in the bypass duct of a duct burner could not be obtained from the use of conventional main burner or afterburner systems referred to above. A main burner conventional design provides too great a pressure loss or too large a cross-sectional area and a conventional afterburner design, which would operate at lower pressure loss, lacks the stability required for operation at the relatively low inlet temperatures, the wide fuel-air ratio range required, and the high efficiency desired.

An object of this invention is to provide a can-type duct burner design having a low pressure loss.

Another object of this invention is to provide a can-type burner wherein all of the air is introduced into the can through ram air openings or scoops. Air will enter the can because inertia carries it in, and there will be little or no static pressure drop over the burner can wall. During combustion, there is actually a small static pressure rise over the wall in some cases. Since the scoops turn the air into the burner efficiently, it is unnecessary to slow down the air to a low velocity upstream of the burner. Consequently, the total cross-sectional area required is greatly reduced.

A further object of this invention is to provide a can-type duct burner design having a pressure loss of approximately 5% at a burner inlet reference Mach number of .14.

Another object of this invention is to provide means for mixing at the exit of the burner can such as vortex generators or turning vanes.

A further object of this invention is to provide a duct burner which can efficiently burn with a burner inlet reference Mach number from .12 to .2.

Another object of this invention is to provide a ram induction type duct burner which will provide high efficiencies over a wide range of fuel-air ratios.

A further object of this invention is to provide a burner which will have stable operation at low inlet temperatures.

Another object of this invention is to provide an annular duct burner for a supersonic transport fan engine.

A further object of this invention is to provide a burner can which will occupy approximately ⅔ of the cross section of the duct.

Another object of this invention is to provide an annular can-type burner in an annular duct where approximately ⅓ of the air entering the duct enters the can with the remainder flowing around the can for bypass flow including duct cooling.

Other objects and advantages will be apparent from the specification and claims and from the accompanying drawings which illustrate an embodiment of the invention.

FIGURE 1 is a longitudinal sectional view of the ducted fan engine.

FIGURE 2 is an enlarged view of the section of the duct containing the annular duct burner showing the burner in longitudinal cross section.

FIGURE 3 is an enlarged view of another modification of an annular duct burner.

FIGURE 4 is an enlarged view of a scoop section.

Figure 5:
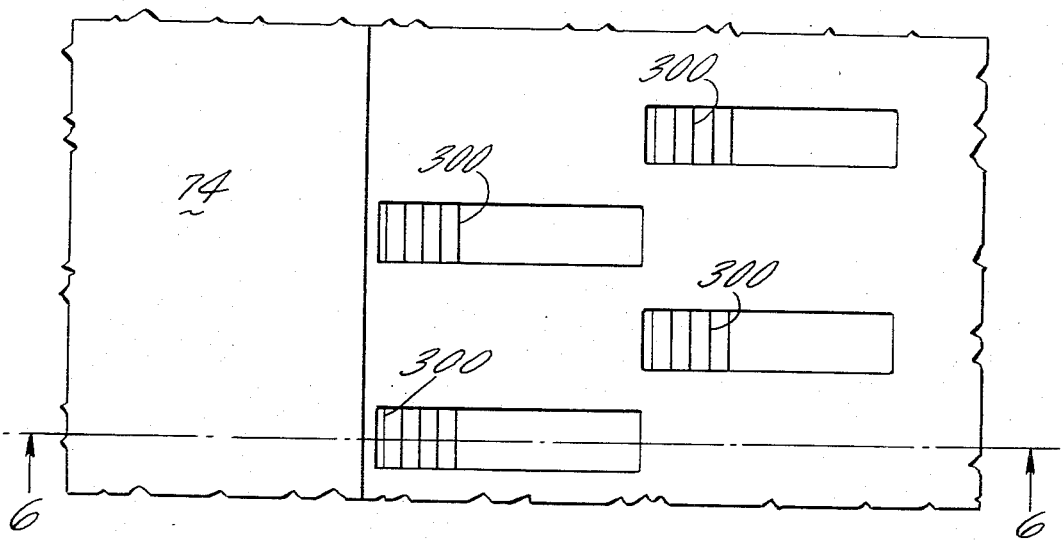
FIGURE 5 is an enlarged section of another modification of one of the cylindrical walls forming an annular conduit as viewed from within a burner.

In FIG. 1 a jet engine 10 is shown having a fan section 8 located at the front thereof and an annular duct 6 located therearound between the rear of the fan 8 and the rear of the engine 10. A nozzle 4 is fixed to the end of the duct 6 and cooperates therewith to control the exit area.

The engine 10 comprises a casing 20 which encloses a compressor section 14, a diffuser inlet means 15, a plurality of main burner cans or a single annular main burner 16, duct means 17 extending from the burners, turbine means 18, and a fixed nozzle 19. This engine can be a conventional jet engine such as is well known in the art, for instance as shown in U.S. Patent No. 2,747,367. The rotor of the compressor 14 which is driven by the turbine 18 includes a forward extension 22 which rotates as the moving part of fan section 8.

The annular duct 6 is formed by an inner wall 24, which encloses the casing 20 and extends from its forward end to its rearward end, and an outer wall 26 extending therearound and being spaced therefrom. The outer wall 26 has an extension on its forward end which encloses the fan. The nozzle 4 is fixed to the rear of the outer wall 26. This nozzle can be any conventional nozzle such as shown in U.S. Patent No. 2,974,480. An annular burner 40 is located in the duct burner 6 at a point approximately midway between the ends of the duct.

The annular burner 40 is formed having an annular leading edge nose piece 42 with a plurality of holes 44 therein for permitting ram air to enter. An annular plate 46 connects the rear free ends of the nose member to space and support them. This member has a plurality of holes 48 for permitting air to flow through from the holes 44. A swirling device is provided in holes 48 for imparting a swirling motion to the fuel and air entering to provide for better mixing. Fuel is sprayed into the annular burner 40 from fuel nozzles 50 located within the nose part 42. A fuel conduit 52 extends to fuel control means, not shown.

The longitudinal cross section of the annular burner 40 in the duct (see FIG. 2) appears as a five section stepped conduit with each section being stepped outwardly forming larger conduits as the burner extends rearwardly. The first annular conduit 54 is formed by an inner cylindrical wall 56, having its forward end spaced inwardly from the rearward end of the inner free end of the nose member 42 and fixed thereto by a plurality of spacing members 58, and an outer cylindrical wall 60, having its forward end spaced outwardly from the rearward end of the outer free end of the nose member 42 and fixed thereto by a plurality of spacing members 62. The rear end of inner cylindrical wall 56 curves outwardly at 64 and the rear end of outer cylindrical wall member 60 curves inwardly at 66.

The second annular conduit 68 is formed by an inner cylindrical wall 70, having its forward end spaced inwardly from the rearward end of the annular wall 56, and an outer cylindrical wall 74, having its forward end spaced outwardly from the rearward end of the annular wall 60. The inner cylindrical wall 70 is fixed to wall 56 by a plurality of spacing members 72 and the outer cylindrical wall 74 is fixed to wall 60 by a plurality of spacing members 76.

The third annular conduit 78 is formed by an inner cylindrical wall 80, having its forward end spaced inwardly from the rearward end of the cylindrical wall 70, and an outer cylindrical wall 82 spaced outwardly from the rearward end of the cylindrical wall 74. Cylindrical wall 82 is formed of alternating scoops 84 and 86 which extend around the entire inner side of the cylindrical plate 90. Alternate short scoops 84 and long scoops 86 provide for proper mixing. The inner cylindrical wall 80 is fixed to wall 70 by a plurality of spacing members 88 and the outer cylindrical wall 82 is fixed to the wall 74 by spacing members 92.

The fourth annular conduit 94 is formed by an inner cylindrical wall 96, having its forward end spaced inwardly from the rearward end of cylindrical wall 80, and an outer cylindrical wall 98, having its forward end spaced outwardly from the rearward end of the cylindrical wall 82. The inner cylindrical wall 96 is fixed to wall 80 by a plurality of spacing members 100 and the outer cylindrical wall 98 is fixed to wall 82 by a plurality of spacing members 102.

The fifth annular conduit 104 is formed by an inner cylindrical wall 106, having its forward end spaced inwardly from the rearward end of annular cylindrical wall 96, and an outer cylindrical wall 108, having its forward end spaced outwardly from the rearward end of the cylindrical wall 98. The inner cylindrical wall 106 is fixed to wall 96 by a plurality of spacing members 110 and the outer cylindrical wall 108 is fixed to wall 98 by a plurality of spacing members 112.

Three zones of fuel injection are provided. Zone one is provided at the nose piece 42, zone two appears at the entrance to the scoops, and zone three appears around the inner and outer annular spaces provided between the fifth annular conduit and its respective cooperating sides.

A conventional jet engine electrical ignition system is used. The spark igniter (not shown) projects through the outer wall 26 and conduit 60 so as to provide a spark within the front end of the burner.

In the arrangement shown in FIGS. 1 and 2, the annular burner 40 occupies about ⅔ of the cross-sectional area of the annular duct 6 in which it is located including the areas of openings 120 and 122. Of the air flowing through the annular duct 6 about ⅓ enters the burner through the various openings forward of the fifth annular conduit 104 and the remainder flows around the outside, including that which flows through an opening 120 in the inner wall 24 and through opening 122 formed by a short annular wall 124 with the rear part of outer wall 26 of the duct 6. The rear portion of wall 24, and wall 124 are formed of porous material to provide for wall cooling. High fuel/air ratios are provided in the burning zones at all times, regardless of overall fuel/air ratios, to promote stability and efficiency. Thus, at very low overall fuel/air ratios, fuel is injected only at zone one in the front end of the burner through the plurality of nozzles 50. At intermediate fuel/air ratios, fuel is also injected into the air through orifices in the annular manifold 126 which is mounted on brackets 128 around the midpart of outer wall 74 of the second annular conduit 68. These orifices open into the entrance to the scoops 84 and 86. This action helps insure that all of the air in the burner contains fuel and is burned. A fuel conduit 129 extends to fuel control means, not shown. Mixing of gases passing from the burner with the cooler bypassed air is promoted by the use of vortex generators 130 and 133 extending respectively around the end of outer wall 108 and inner wall 106. It is noted that at this point the static pressure in the end of the burner is equal to the static pressure around the end of the burner ($P_{s1}=P_{s2}$). While vortex generators are shown, other mixing means can be used such as vanes. At higher fuel/air ratios, the burner fuel injection is continued and additional fuel is injected into the bypassed air through orifices in annular manifolds 136 and 138 which are mounted on brackets 140 and 142, respectively, to the forward end of outer wall 108 and the wall 24 in approximately the same plane. The bypassed fuel/air mixture burns as it mixes with the hot burner gases, without need of flameholders. A fuel conduit 137 extends from annular manifold 136 to fuel control means, not shown, and a fuel conduit 139 extends from annular manifold 138 to fuel control means, not shown.

The burner 40 can be supported in the annular duct 6 by any means desired. In FIG. 2 this is done by a plurality of inner radially extending members 57 and 97 and outer radially extending members 61 and 99. Inner radially extending members 57 extend between inner wall 24 and inner cylindrical wall 56 and outer radially extending members 61 extend between outer wall 26 and outer cylindrical wall 60. Inner radially extending members 97 extend between inner wall 24 and inner cylindrical wall 96 and outer radially extending members 99 extend between outer wall 26 and outer cylindrical wall 98.

In a design of the burner and duct as shown in FIGS. 1 and 2, the arrangement was such that 5% of the flow passed through annular opening 120 for inner liner cooling, and 3% through annular opening 122 for outer liner cooling plus 6% for nozzle flap cooling. The balance of the flow was divided so that 33.33% passed through the burner can and 66.66% bypassed the can (including the 14% cooling flow). The burner can flow was divided in that 40% was primary flow, 30% secondary flow and 30% cooling flow. At a cruise condition the inlet reference Mach number was .143 and the pressure loss was approximately 5% of the inlet pressure.

In this design of the burner and duct the area of the fifth annular conduit 104 was figured at 11.40 sq. ft. while the area of the annulus between wall 24 and wall 106 and the annulus between wall 124 and wall 108 were each figured to be 2.25 sq. ft. with the area of the opening 120 being figured at .43 sq. ft. and the area of opening 122 being figured at .77 sq. ft., this total area therefore making 5.70 sq. ft. It can be seen that the area of the burner can at its largest point is twice that of the total area of the duct and cooling openings at that point. The total reference duct area at the location of the first conduit 54 was figured at 17.1 sq. ft.

In FIG. 3 the annular burner 40A is formed having an annular leading edge nose piece 142 with a plurality of holes 144 therein for permitting ram air to enter. An annular plate 146 connects the rear free ends of the nose member 142 to space and support them. This member has a plurality of holes 148 in which are supported sleeves 149. A swirling device 147 is provided in sleeves 149 for imparting a swirling motion to the fuel and air entering to provide for better mixing. A conical member 151 is fixed to the rearwardly facing end of each sleeve 149. Air from holes 144 flows through sleeves 149 and associated members 151 into the burner. Fuel is sprayed into the annular burner 40A from fuel nozzles 150 located within the nose part 142. A fuel conduit 152 extends to fuel control means, not shown.

The longitudinal cross section of the annular burner 40A in the duct (see FIG. 3) appears as a three stepped conduit with each section being stepped outwardly as it extends rearwardly. The first annular conduit 154 is formed with an inner frustro-conical wall 156, having its forward end spaced inwardly from the rearward end of the inner free end of the nose member 142 and fixed thereto by a plurality of spacing members 158, and an outer frustro-conical wall 160, having its forward end spaced outwardly from the rearward end of the outer free end of the nose member 142 and fixed thereto by a plurality of spacing members 162. Each of the walls 156 and 160 is formed to support short scoops 184 and long scoops 186 alternately therearound (note FIG. 4 showing scoops of FIG. 2). Each wall, 156 and 160, is cut to receive the scoops 184 and 186 so that the scoops are slanted inwardly with the inlet ends located in the airstream and the scoop ends directed into the interior of the burner.

The second annular conduit 168 is formed with an inner frustro-conical wall 170, having its forward end spaced inwardly from the rearward end of the wall 156 and fixed thereto by a plurality of spacing members 172, and an outer frustro-conical wall 174, having its forward end spaced outwardly from the rearward end of the wall 160 and fixed thereto by a plurality of spacing members 176. Each of the walls 170 and 174 is formed to support short scoops 184 and long scoops 186 alternately therearound. Each wall, 170 and 174, is cut to receive the scoops 184 and 186 so that the scoops are slanted inwardly with the inlet ends located in the airstream and the scoop ends directed into the interior of the burner.

The third annular conduit 178 is formed with an inner frustro-conical wall 180, having its forward end spaced inwardly from the rearward end of the wall 170 and fixed thereto by a plurality of spacing members 188, and an outer frustro-conical wall 190, having its forward end spaced outwardly from the rearward end of the wall 174 and fixed thereto by a plurality of spacing members 192.

The burner can 40A can be supported in the annular duct 6 by any means desired. In FIG. 3 this is done by a plurality of inner radially extending members 157 and 169 and outer radially extending members 161 and 175. Inner radially extending members 157 extend between inner wall 24 and conical wall 156 and outer radially extending members 161 extend between outer wall 26 and conical wall 160. Inner radially extending members 169 extend between inner wall 24 and inner conical wall 170 and outer radially extending members 175 extend between outer wall 26 and conical wall 174. In this modification, the spacing made by members 158, 162, 172, 176, 188 and 192 are for cooling.

Two zones of fuel injection are provided. Zone one is provided at the nose piece 142, and zone two appears at the beginning of the wall 190 and wall 180. It is noted that at this point the static pressure in the end of the burner is equal to the static pressure around the end of the burner ($P_{s1}=P_{s2}$). Zone two provides for injection of fuel into the air through orifices in the annular manifolds 200 and 201. Annular manifold 200 is mounted on brackets 202 around the forward part of wall 190 and manifold 201 is mounted on brackets 203 around the forward part of the wall 180. Fuel conduits 250 and 252 extend to fuel control means, not shown. Vortex generators 230 and 233 extend inwardly from the outer wall 124 and outwardly from the inner wall 24, respectively.

In a design of the burner as shown in FIG. 3 along with the duct shown in FIG. 1, the flow was divided so that approximately ⅓ passed through the can and approximately ⅔ bypassed the can (including the 14% cooling flow). The burner can flow was divided in that 35% was primary flow, 35% secondary flow and 30% cooling flow.

The scoops may be constructed in any desired manner which efficiently turns the air into the burner. The scoops shown in FIGS. 2, 3 and 4 are ducts with smooth bends.

Figure 6:
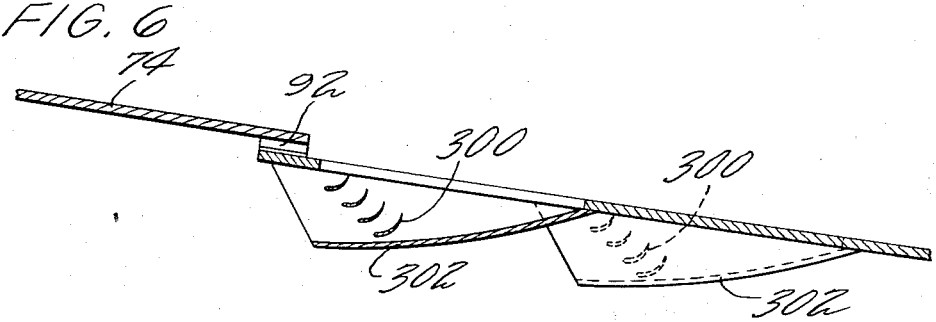
FIGURE 6 is a view taken along the line 6—6 of FIG. 5 showing a longitudinal cross section thereof.

FIGS. 5 and 6 show square or sharp turns made with turning vanes 300 within scoops 302 formed in a cylindrical wall forming part of the stepped conduit configuration.

It is to be understood that the invention is not limited to the specific description above or other specific figures, but may be used in other ways without departure from its spirit as defined by the following claims.

We claim:

1. In combination, a first duct for receiving a flow of air therethrough, said first duct having an inlet and outlet, a burner can located in said first duct between said inlet and outlet, said burner can having a nose section from which fuel is discharged into the can, a first solid walled duct extending rearwardly from said nose section having its forward end spaced outwardly away from the rearward end of the nose section forming an inlet to said can, the remainder of the burner can consisting of one or more solid walled ducts each being connected to the rear end of the preceding one and spaced outwardly away therefrom forming other inlets to said can, at least one of said solid walled ducts having a side comprising a plurality of scoops having a plurality of exit locations directed inwardly thereof with the inlets to the scoops facing forwardly in the first duct to receive air therefrom forming other inlets to said can, the last of said solid walled ducts having an outlet exhausting into said first duct, passage means being formed between the exterior of said can and the interior of said first duct, said passage means bypassing a substantial portion of the flow of air in said first duct around the burner can.

2. The combination as set forth in claim 1 wherein said passage means bypasses approximately two-thirds of the flow of air in said first duct.

3. The combination as set forth in claim 1 wherein fuel is discharged into the air leaving said passage means, means for promoting the mixing of gases passing from said passage means and passing from the outlet of said last of said solid walled ducts.

4. The combination as set forth in claim 1 wherein the rearward end of the last of said solid walled ducts has an area equal to approximately two-thirds of the area of said duct.

5. The combination as set forth in claim 4 wherein said inlets to said burner can receive and inject approximately one-third to one-half of the air entering said first duct into said burner can.

6. The combination as set forth in claim 1 wherein the exit location of each scoop directs the air radially inwardly.

7. The combination as set forth in claim 1 wherein said nose section has an opening which faces forwardly in said first duct and receives airflow therethrough.

References Cited

UNITED STATES PATENTS

| | | | |
|---|---|---|---|
| 2,531,810 | 11/1950 | Fyffe | 60—39.65 |
| 2,546,432 | 3/1951 | Darling | 60—39.65 X |
| 2,603,949 | 7/1952 | Brown | 60—39.65 |
| 2,637,974 | 5/1953 | Nathan | 60—224 |
| 2,647,369 | 8/1953 | Leduc | 60—39.74 |
| 2,704,435 | 3/1955 | Allen. | |
| 2,773,350 | 12/1956 | Barrett | 60—39.74 X |
| 2,787,120 | 4/1957 | Leduc | 60—39.74 X |
| 2,798,360 | 7/1957 | Hazen | 60—225 |
| 2,830,439 | 4/1958 | Johnson | 60—39.74 |

FOREIGN PATENTS

| | | |
|---|---|---|
| 545,787 | 9/1957 | Canada. |
| 836,117 | 6/1960 | Great Britain. |

CARLTON R. CROYLE, *Primary Examiner.*

MARK M. NEWMAN, *Examiner.*

D. HART, *Assistant Examiner.*